B. T. STIDWORTHY.
POWER BELT.
APPLICATION FILED APR. 29, 1911.
1,004,308.
Patented Sept. 26, 1911.
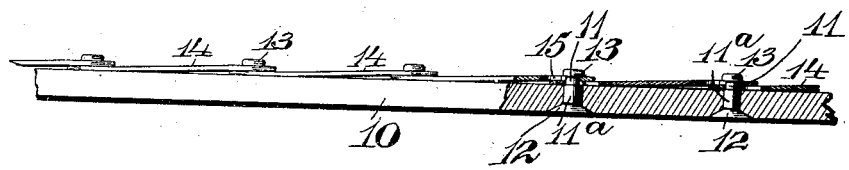
Fig. 1
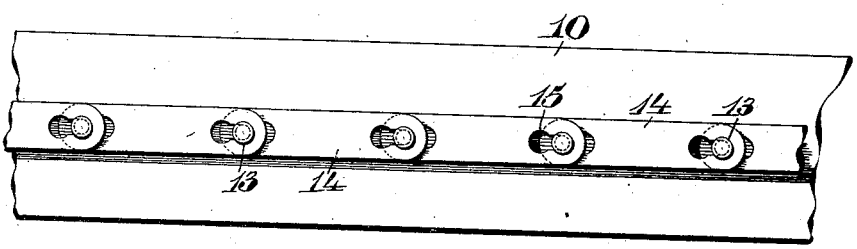
Fig. 2
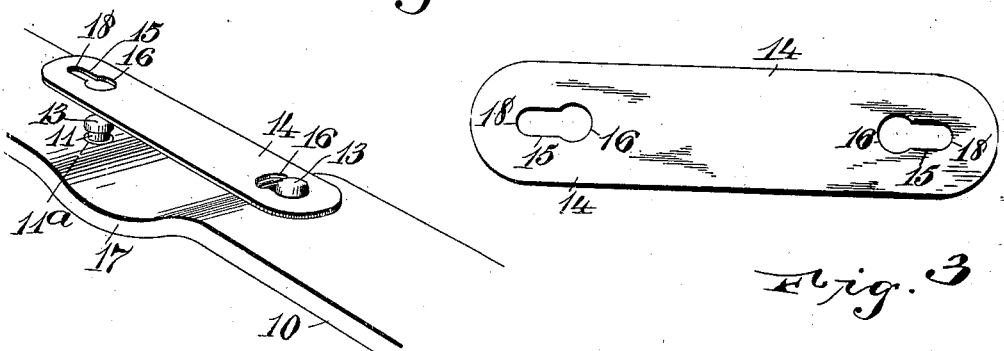
Fig. 3
Fig. 4
WITNESSES:
Omer J. King.
Elizabeth S. King.
But T Stidworthy
INVENTOR
BY
Wm H Canfield.
ATTORNEY

UNITED STATES PATENT OFFICE.

BERT T. STIDWORTHY, OF NETCONG, NEW JERSEY.

POWER-BELT.

1,004,308.

Specification of Letters Patent. Patented Sept. 26, 1911.

Application filed April 29, 1911. Serial No. 624,071.

*To all whom it may concern:*

Be it known that I, BERT T. STIDWORTHY, a citizen of the United States, residing at Netcong, in the county of Morris and State of New Jersey, have invented certain new and useful Improvements in Power-Belts; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a means for insuring substantially fixed length of flexible belting, and is designed to provide a leather power belt, or a belt of similar material, with means on it for preventing its being unduly stretched when in use.

The invention is further designed to provide a device of this kind which is detachable, and that can be removed from the belt to have broken parts replaced without any considerable loss of time.

The device is particularly adapted for power belts, and especially the belts such as used on motor-cycles or on the fans of automobiles where the stretching of the belt impairs the efficiency of the machine, and unless the belt is shortened it prevents the successful operation of the parts.

The invention is illustrated in the accompanying drawing, in which—

Figure 1 is a side view of a part of a belt, being broken partly away to show the belt and the attachment in section. Fig. 2 is a top view of Fig. 1. Fig. 3 is a top view, enlarged, of one of the plates employed to hold the belt at its proper length. Fig. 4 is a perspective view showing the method of attaching one of the plates to the belt.

The invention is designed for use on any form of strap 10, these straps being made of flexible material so as to go around the pulleys, and the particular kind of belt that the device is designed for is leather belting which has considerable stretch to it, and this stretching makes it necessary, ordinarily, to shorten the belt from time to time.

My invention is designed to provide a detachable external means to hold the belt at its fixed length by engaging the strap at intervals and having elements connecting these intervals, which elements are connected to each other and also to the strap. I have illustrated in this case one particular way of bringing about the desired result, but I do not wish to be limited to this manner of holding the parts of the belt in fixed relation to each other, but permitting the belt to conform to the circular periphery of a pulley.

The preferred form of means for preventing the stretching of the belt consists of studs $11^a$, which are passed through the strap, having the countersunk heads 12 on one end, the countersunk heads making the inside or bottom of the belt flush and not interfering in the least with its traction on the pulleys, permitting the major portion of the belt to engage the pulleys to transmit power. The projecting end of each stud $11^a$ is provided with a head 13, and below the head is a circular or annular groove 11, which groove is constructed so as to provide enough space between the top of the strap and the head for the reception of the links or plates which connect the studs and hold them at their normal distances from each other. I prefer to use the links 14 which are adapted to be fitted over the studs and secured thereto, making the movement of the studs beyond a certain distance from each other impossible. The preferred way of fastening the links 14 to the studs is by means of the key-hole slots 15, a key-hole slot being arranged in each end of a link, the enlarged end 16 of each slot being placed toward the center of the link. The links are preferably placed over the studs as shown in Fig. 1, the studs being placed on successively until the whole length of the strap is provided with them.

The method of attaching the links is shown in Fig. 4 where I have illustrated the strap 10 bent as at 17 so that the heads 13 of the studs $11^a$ are brought closer together and are in position to have the heads of the studs pass through the enlarged end 16 of the key-hole slots 15. After the heads 13 have been passed through the enlarged ends 16, the strap is straightened out and the studs are caused to move to the small ends 18 of the key-hole slots so that the distance between the small ends of the key-hole slots is equal to the distance between the studs. It will be evident from this description and from the illustration that the links can be easily removed for the purpose of repairing them or installing new ones, and the device can be made cheaply.

The grooved rivets are preferable over ordinary headed rivets on account of the function of the bottom edge of the groove which bears against the bottom of the plates and keeps them from rubbing on the strap, especially preventing the plates from wearing the strap when it is curved to go around the pulleys.

This device will effectually prevent a driving belt from stretching and overcomes the necessity of constantly shortening the belt to provide for this elongation due to the strain put upon it.

Having thus described my invention, what I claim is:—

1. A driving belt consisting of a strap of material subject to stretching, studs projecting from the outside face of the strap, and links having means coöperating with the studs for securing them in place, the links being adapted to connect the studs and thus secure the belt against stretching.

2. A driving belt consisting of a strap of material subject to stretching, links arranged to be connected to form a band on the outside of the strap to prevent the stretching of the strap, and means for detachably securing each link at its ends to the strap, said means also acting to connect the links.

3. A driving belt consisting of a strap of material subject to stretching, studs projecting from the outside face of the strap, and plates having key-hole slots at their ends and adapted to fit over the studs, the studs having heads under which the walls of the slots are adapted to be seated to prevent their accidental displacement.

4. A driving belt consisting of a strap of flexible material subject to stretching, and plates adapted to be placed end to end on the outside face of the belt to prevent such stretching, the plates and the strap having co-acting means to secure them together, said co-acting means being made operative when the belt is in its flat normal position and adapted to be separated when the belt is bent concave on its outer face.

5. A driving belt made of a strap of flexible material subject to stretching, studs projecting from the strap, the studs having heads thereon, and plates having key-hole slots at each end, the key-hole slots having their enlarged ends disposed inwardly, the studs being placed on the strap with intervals between them equal to the distance between the narrow ends of the slots on the plate whereby when the strap is bent so as to be concave on its outer surface the heads of the studs can be passed through the enlarged ends of the key-hole slots, the studs sliding to the narrow ends of the key-hole slots when the strap is flattened.

In testimony, that I claim the foregoing, I have hereunto set my hand this 11th day of April 1911.

BERT T. STIDWORTHY.

Witnesses:
  WM. H. CAMFIELD,
  M. A. JOHNSON.